United States Patent
Chen et al.

(10) Patent No.: US 12,534,650 B2
(45) Date of Patent: Jan. 27, 2026

(54) COMPOSITION FOR PREPARING A RELEASE COATING AND METHOD OF PREPARING COATED SUBSTRATE

(71) Applicant: DOW SILICONES CORPORATION, Midland, MI (US)

(72) Inventors: Yu Chen, Shanghai (CN); Fuming Huang, Shanghai (CN); Shi Pan, Shanghai (CN); Jiguang Zhang, Shanghai (CN); Hongyu Chen, Shanghai (CN); Zhihua Liu, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 309 days.

(21) Appl. No.: 18/290,464

(22) PCT Filed: May 24, 2021

(86) PCT No.: PCT/CN2021/095485
§ 371 (c)(1),
(2) Date: Nov. 14, 2023

(87) PCT Pub. No.: WO2022/246594
PCT Pub. Date: Dec. 1, 2022

(65) Prior Publication Data
US 2024/0271016 A1 Aug. 15, 2024

(51) Int. Cl.
| | | |
|---|---|---|
| *C09J 7/40* | (2018.01) | |
| *C08G 18/10* | (2006.01) | |
| *C08G 18/24* | (2006.01) | |
| *C08G 18/61* | (2006.01) | |
| *C08G 77/08* | (2006.01) | |
| *C08G 77/16* | (2006.01) | |
| *C09D 183/04* | (2006.01) | |

(52) U.S. Cl.
CPC .............. *C09J 7/401* (2018.01); *C08G 18/10* (2013.01); *C08G 18/246* (2013.01); *C08G 18/61* (2013.01); *C08G 77/08* (2013.01); *C08G 77/16* (2013.01); *C09D 183/04* (2013.01); *C09J 2483/005* (2013.01)

(58) Field of Classification Search
CPC ........ C09J 7/401; C09J 2483/005; C09J 7/22; C09J 183/04; C08G 18/10; C08G 18/246; C08G 18/61; C08G 77/08; C08G 77/16; C08G 18/73; C08G 18/7664; C08G 77/46; C08G 77/70; C09D 183/04; C09D 5/20; C08L 75/00
See application file for complete search history.

(56) References Cited

U.S. PATENT DOCUMENTS

| | | |
|---|---|---|
| 5,792,554 A | 8/1998 | Leir et al. |
| 7,163,720 B1 | 1/2007 | Dhaler et al. |
| 2010/0280148 A1 | 11/2010 | Webster et al. |
| 2011/0237740 A1 | 9/2011 | Iyer et al. |
| 2015/0024157 A1 | 1/2015 | Tullberg |
| 2020/0002460 A1 | 1/2020 | Zhu et al. |

FOREIGN PATENT DOCUMENTS

| | | |
|---|---|---|
| CN | 107418279 A | 12/2017 |
| EP | 3515961 A1 | 7/2019 |
| WO | WO 2005/037887 | * 12/2005 |

OTHER PUBLICATIONS

International Search Report for PCT/CN2021/095485 dated Sep. 14, 2021, 4 pages.
Machine assisted English translation of CN107418279A obtained from https://worldwide.espacenet.com/patent on Nov. 13, 2023, 23 pages.

* cited by examiner

*Primary Examiner* — Michael B Nelson
(74) *Attorney, Agent, or Firm* — Warner Norcross + Judd LLP

(57) ABSTRACT

A composition for forming a release coating comprises (A) an organopolysiloxane having an average of at least two carbinol functional groups per molecule. The organopolysiloxane (A) is present in the composition in an amount of from 50 to 99 wt. % based on the total weight of the composition. The composition further comprises (B) a polyisocyanate. The release coating formed with the composition is not a foam. A release coating formed with the composition is also disclosed. In addition, a method of preparing a coated substrate comprising a release coating disposed on a substrate, as well as the coated substrate formed in accordance with the method, are disclosed.

15 Claims, No Drawings

COMPOSITION FOR PREPARING A RELEASE COATING AND METHOD OF PREPARING COATED SUBSTRATE

CROSS-REFERENCE TO RELATED APPLICATIONS

This application is the U.S. National Stage of and claims priority to PCT/CN2021/095485 filed on 24 May 2021, the contents of which is incorporated herein by reference.

TECHNICAL FIELD

The subject disclosure generally relates to a composition and, more specifically, to a composition for preparing a release coating and related methods.

BACKGROUND

Silicone compositions are known in the art and utilized in myriad industries and end use applications. One such end use application is to form release coatings or liners from which adhesives can be removed. For example, silicone compositions may be utilized to coat various substrates, such as paper, to give release liners for laminating pressure sensitive adhesives (e.g. tapes). Such silicone compositions are typically addition-curable.

Conventional release liners are typically formed by addition reacting (or hydrosilylating) an organopolysiloxane having an unsaturated hydrocarbon group and an organohydrogenpolysiloxane in the presence of a hydrosilylation reaction catalyst at an elevated temperature. In certain applications, release liners are formed at high speeds via a coating process. Cure speed in formation of conventional release liners is particularly important. In addition, many conventional release liners are formed on substrates that are susceptible to softening or other undesirable effects attributable to elevated temperatures required for curing, which limits the types of substrates that can be utilized.

BRIEF SUMMARY

A composition for forming a release coating is disclosed. The composition comprises (A) an organopolysiloxane having an average of at least two carbinol functional groups per molecule. The organopolysiloxane (A) is present in the composition in an amount of from 50 to 99 wt. % based on the total weight of the composition. The composition further comprises (B) a polyisocyanate. The release coating formed with the composition is not a foam. A release coating formed with the composition is also disclosed.

In addition, a method of preparing a coated substrate comprising a release coating disposed on a substrate, as well as the coated substrate formed in accordance with the method, are disclosed.

DETAILED DESCRIPTION OF THE INVENTION

A composition for forming a release coating is disclosed. The composition comprises (A) an organopolysiloxane having an average of at least two carbinol functional groups per molecule. Carbinol functional groups on organopolysiloxanes are distinguished from silanol groups, where carbinol functional groups include a carbon-bonded hydroxyl group, and silanol functional groups include a silicon-bonded hydroxyl group. Said differently, carbinol functional groups include a moiety of formula —COH, whereas silanol functional groups are of formula —SiOH. These functional groups perform differently; for example, silanol functional groups can readily condense to give siloxane (—SiOSi—) bonds, which generally does not occur with carbinol functional groups (at least under the same catalysis of condensation of silanol functional groups). The carbinol functional groups of component (A) can be the same as or different from one another. In certain embodiments, the organopolysiloxane (A) comprises an average of at least three, alternatively at least four, carbinol functional groups per molecule. For example, the organopolysiloxane (A) can include an average of from 2 to 8, alternatively from 3 to 8, alternatively from 3 to 7, alternatively from 3 to 6, alternatively from 3 to 5, carbinol functional groups per molecule.

In certain embodiments, the carbinol functional groups independently have the general formula -D-$O_a$—$(C_bH_{2b}O)_c$—H, where D is a covalent bond or a divalent hydrocarbon linking group having from 2 to 18 carbon atoms, subscript a is 0 or 1, subscript b is independently selected from 2 to 4 in each moiety indicated by subscript c, and subscript c is from 0 to 500, with the proviso that subscripts a and c are not simultaneously 0.

In one embodiment, subscript c is at least one such that at least one of the carbinol functional groups has the general formula:

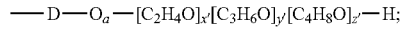

$$—D—O_a—[C_2H_4O]_{x'}[C_3H_6O]_{y'}[C_4H_8O]_{z'}—H;$$

where D is a covalent bond or a divalent hydrocarbon linking group having from 2 to 18 carbon atoms, subscript a is 0 or 1, $0 \le x' \le 500$, $0 \le y' \le 500$, and $0 \le z' \le 500$, with the proviso that $1 \le x'+y'+z' \le 500$. In these embodiments, the carbinol functional group may alternatively be referred to as a polyether group or moiety, although the polyether group or moiety terminates with —COH, rather than —$COR^0$, where $R^0$ is a monovalent hydrocarbon group, which is the case with certain conventional polyether groups or moieties. As understood in the art, moieties indicated by subscript x are ethylene oxide (EO) units, moieties indicated by subscript y are propylene oxide (PO) units, and moieties indicated by subscript z are butylene oxide (BO) units. The EO, PO, and BO units, if present, may be in block or randomized form in the polyether group or moiety. The relative amounts of EO, PO, and BO units, if present, can be selectively controlled based on desired properties of the organopolysiloxane (A), composition, and resulting release coating. For example, the molar ratios of such alkylene oxide units can influence hydrophilicity and other properties.

Each carbinol functional group of component (A) may include more than one —COH moiety per carbinol functional group. Said differently, a single carbinol functional group substituent may include more than one carbinol functional moiety. By way of example, any of the EO, PO, or BO units in the carbinol functional group may include a pendent OH group, i.e., a hydrogen atom of the EO, PO, or BO group may be substituted with an OH group. As but one example, the carbinol functional group may be of formula -D-O—$CH_2CH(OH)CH_2OH$.

In one embodiment, component (A) is typically substantially linear. By substantially linear, it is meant that component (A) comprises, consists essentially of, or consists of only M and D siloxy units. As readily understood in the art, M siloxy units are of formula [$R_3SiO_{1/2}$] and D siloxy units are of formula [$R_2SiO_{2/2}$]. Traditionally, M and D siloxy nomenclature is utilized in connection with only methyl substitution. However, for purposes of this disclosure, in the M and D siloxy units above, R is independently selected from substituted or unsubstituted hydrocarbyl groups or carbinol functional groups, with the proviso that at least two of R are independently selected carbinol functional groups. When the M siloxy unit includes at least one carbinol functional group, the carbinol functional group is terminal. When the D siloxy unit includes at least one carbinol functional group, the carbinol functional group is pendent. The substantially linear organopolysiloxane may have the average formula: $R_aSiO_{(4-a')/2}$, where each R is independently selected and defined above, including the proviso that at least two of R are independently selected carbinol functional groups, and where subscript a' is selected such that $1.9 \leq a' \leq 2.2$.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, iso-propenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In specific embodiments, each R that is not a carbinol functional group is independently selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms.

In embodiments where component (A) is linear, component (A) may have the general formula:

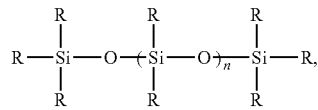

where each R is an independently selected and defined above, including the proviso that at least two of R independently comprise a carbinol functional group, and subscript n is from 0 to 1,000, alternatively from 1 to 800, alternatively from 5 to 500. Subscript n may alternatively be referred to as the degree of polymerization (DP) of component (A). Typically, DP is inversely proportional to viscosity, all else (e.g. substituents) being equal. Subscript n is alternatively from greater than 0 to 95, alternatively from greater than 0 to 90, alternatively from greater than 0 to 85, alternatively from greater than 0 to 80, alternatively from greater than 0 to 75, alternatively from greater than 0 to 70, alternatively from greater than 0 to 65. Alternatively, subscript n is from 5 to 70, alternatively from 10 to 65.

In specific embodiments when component (A) is linear, each carbinol functional group has the general formula -D-$O_a$—$(C_bH_{2b}O)_c$—H and is pendent, where D and subscripts a-c are defined above, such that the organopolysiloxane (A) has the following general formula:

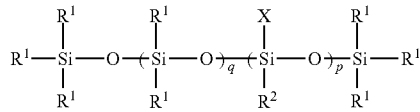

where each $R^1$ is an independently selected substituted or unsubstituted hydrocarbyl group, each X is -D-$O_a$—$(C_bH_{2b}O)_c$—H, where D and subscripts a-c are defined above, each subscript $R^2$ is independently selected from $R^1$ and X, and subscripts p and q are each from 1 to 99, with the proviso that $p+q \leq 100$, alternatively $5 < (p+q) < 70$, alternatively $10 < (p+q) < 65$. In the general formula above, the siloxy units indicated by subscripts q and p may be randomized or in block form. The general formula above is intended to be a representation of the average unit formula of component (A) in this embodiment based on the number of $R_{12}SiO_{2/2}$ units indicated by subscript q and $R^2XSiO_{2/2}$ units indicated by subscript p without requiring a particular order thereof. Thus, this general formula may be written alternatively as $[(R^1)_3SiO_{1/2}]_2[(R^1)_2SiO_{2/2}]_q[(R^1)XSiO_{2/2}]_p$, where subscripts q and p are defined above. In these embodiments, the carbinol functional groups are polyether groups, and the polyether groups are pendent in component (A). When each $R^1$ is methyl, this embodiment of component (A) is trimethylsiloxy endblocked, and includes dimethylsiloxy units (indicated by subscript q).

In other embodiments when component (A) is linear, each carbinol functional group has the general formula -D-$O_a$—$(C_bH_{2b}O)_c$—H and is terminal, where D and subscripts a-c are defined above, such that the organopolysiloxane (A) has the following general formula:

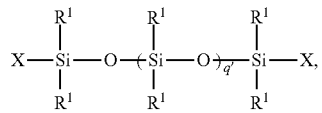

Where each $R^1$ is independently selected and defined above, each X is independently selected and defined above, and q' is from 1 to 100, alternatively from 5 to 70, alternatively from 10 t 65. In yet other embodiments, component (A) is linear and the carbinol functional groups are in both linear and pendent positions.

D is typically a function of preparing the organopolysiloxane (A). For example, the organopolysiloxane (A) may be formed by a hydrosilylation-reaction between an organohydrogenpolysiloxane and an unsaturated carbinol compound (which may be referred to herein as an alcohol compound, or an unsaturated alcohol compound). In such embodiments, the organohydrogenpolysiloxane includes silicon-bonded hydrogen atoms at locations (e.g. terminal and/or pendent) where carbinol functionality is desired. The unsaturated alcohol compound may have formula $Z-O_a-(C_bH_{2b}O)_c-H$, where Z is an ethylenically unsaturated group, and subscripts a, b, and c are as defined above. Suitable examples of hydrocarbyl groups are defined above for R.

In the hydrosilylation-reaction above, the ethylenically unsaturated group represented by Z can be an alkenyl and/or alkynyl group having from 2 to 18, alternatively from 2 to 16, alternatively from 2 to 14, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2=CH-$, $CH_2=CHCH_2-$, $CH_2=CH(CH_2)_4-$, $CH_2=CH(CH_2)_6-$, $CH_2=C(CH_3)CH_2-$, $H_2C=C(CH_3)-$, $H_2C=C(CH_3)-$, $H_2C=C(CH_3)CH_2-$, $H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Typically, ethylenic unsaturation is terminal in Z. As understood in the art, ethylenic unsaturation may be referred to as aliphatic unsaturation. Thus, when D is $-CH_2CH_2-$, for example, the unsaturated carbinol compound can have formula $CH_2=CH-O_a-(C_bH_{2b}O)_c-H$. The number of carbon atoms in D is a function of the number of carbon atoms in the ethylenically unsaturated group, which remains constant even after the hydrosilylation-reaction to prepare component (A).

By way of example, the unsaturated alcohol compound can comprise an alkenyl alkoxylate, such as allyl ethoxylate, vinyloxybutyl ethoxylate, isoprenyl ethoxylate, vinylbutyl propoxylate, and/or or polyethylene glycol monoallyl ether.

In certain embodiments, the hydrosilylation-reaction catalyst utilized to form component (A) comprises a Group VIII to Group XI transition metal. Reference to Group VIII to Group XI transition metals is based on the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation-reaction catalyst.

Additional examples of catalysts suitable for the hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation-reaction catalyst.

The hydrosilylation-reaction catalyst may be in any suitable form. For example, the hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The hydrosilylation-reaction catalyst may also be disposed in a vehicle, e.g. a solvent which solubilizes the hydrosilylation-reaction catalyst, alternatively a vehicle which merely carries, but does not solubilize, the hydrosilylation-reaction catalyst. Such vehicles are known in the art.

In specific embodiments, the hydrosilylation-reaction catalyst comprises platinum. In these embodiments, the hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art.

Complexes of platinum with organopolysiloxanes suitable for use as the hydrosilylation-reaction catalyst include 1,3-diethenyl-1,1,3,3-tetramethyldisiloxane complexes with platinum. These complexes may be microencapsulated in a resin matrix. Alternatively, the hydrosilylation-reaction catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole $(COD)PtCl_2$ with 0.045 mole COD and 0.0612 moles $HMeSiCl_2$, where COD is cyclo-octadiene.

The hydrosilylation-reaction catalyst is utilized in the composition in a catalytic amount, i.e., an amount or quantity sufficient to promote curing thereof at desired conditions. The hydrosilylation-reaction catalyst can be a single hydrosilylation-reaction catalyst or a mixture comprising two or more different hydrosilylation-reaction catalysts.

Alternatively, D can be a covalent bond when component (A) is formed via a reaction other than hydrosilylation, e.g. a condensation reaction or a ring opening reaction.

As introduced above, in other embodiments, the organopolysiloxane (A) is branched, i.e., component (A) includes at least one T and/or Q siloxy unit. In one specific embodiment, the organopolysiloxane (A) is a Q-branched polymer, i.e., the organopolysiloxane (A) includes a single Q siloxy unit. In other embodiments, the organopolysiloxane (A) includes two or more Q units. In yet other embodiments, the organopolysiloxane (A) includes one or more T units, or T units in combination with Q units. Even when the organopolysiloxane (A) includes branching attributable to T and/or Q units, the organopolysiloxane (A) is typically flowable at 25° C. By "flowable", it is meant that the organopolysiloxane (A) is flowable at 25° C. and/or has a viscosity that is measurable at 25° C. In certain embodiments, the organopolysiloxane (A) is flowable in the absence of any solvent, e.g. organic solvent. In specific embodiments, the organopolysiloxane (A) is a liquid at 25° C. in the absence of any solvent. In contrast, MQ resins, which are distinguishable from Q-branched polymers, are typically solids at room temperature unless dissolved in a solvent.

In certain embodiments where the organopolysiloxane (A) is branched, the organopolysiloxane (A) has the following average formula:

wherein $0 \leq v \leq 12$; $0 \leq w \leq 8$, $0 \leq x \leq 8$, $40 \leq y \leq 1{,}000$ and $0 \leq z \leq 8$, with the proviso that $2 \leq (x+z) \leq 8$; each $R^1$ is independently selected and defined above; each X is an independent selected carbinol functional group; and $Z^1$ is independently a moiety of formula $(O_{1/2}SiR^1_2\text{-}D^1\text{-}R^1SiO_{2/2})$ or $(O_{1/2}SiR^1_2\text{-}D^1\text{-}R^1_2SiO_{1/2})$, where each $R^1$ is independently selected and defined above, and each $D^1$ is an independently selected divalent linking group. In the moiety indicated by subscript v, the silicon atoms are linked via $D^1$, which is typically a divalent hydrocarbon groups from hydrosilylation. Subscripts v, w, x, y and z represent the number of moles of each particular siloxy unit per Q siloxy unit. In the average formula above, subscripts v, w, x, y, and z are normalized based on there being one Q siloxy unit. However, this is not meant to imply that the organopolysiloxane (A) includes but one Q siloxy unit. In certain embodiments, the organopolysiloxane (A) includes but one Q siloxy unit. In other embodiments, the organopolysiloxane (A) includes Q siloxy units, which may be bonded together in component (A). In yet other embodiments, the organopolysiloxane (A) includes more than two Q siloxy units, i.e., a plurality of Q siloxy units, which may be clustered together in component (A).

In a specific embodiment, subscript v is 0. In another specific embodiment, subscript v is from 2 to 12, alternatively from 2 to 11, alternatively from 2 to 10, alternatively from 2 to 8, alternatively from 2 to 7, alternatively from 2 to 6, alternatively from 3 to 6, alternatively from 3 to 5. In these or other embodiments, subscript w is from 0 to 8, alternatively from 2 to 8, alternatively from 3 to 8, alternatively from 4 to 8, alternatively from 5 to 8, alternatively from 6 to 8, alternatively 7 or 8, alternatively 8. In these or other embodiments, subscript x is from 0 to 8, alternatively from 0 to 6, alternatively from 0 to 4, alternatively from 0 to 3, alternatively from 0 to 2, alternatively 0 or 1, alternatively 0. In these or other embodiments, subscript y is from 40 to 500, alternatively from 40 to 400, alternatively from 40 to 300, alternatively from 40 to 200, alternatively from 50 to 150, alternatively from 60 to 125. In these or other embodiments, subscript z is from 1 to 8, alternatively from 2 to 7, alternatively from 3 to 6, alternatively from 3 to 5, alternatively 4. $D^1$ is typically a divalent hydrocarbon group and has from 2 to 12, alternatively from 2 to 10, alternatively from 2 to 8, alternatively from 2 to 6, alternatively from 2 to 4, alternatively 2, carbon atoms. For example, $D^1$ has two carbon atoms when the hydrosilylation reaction involves a silicon-bonded vinyl group.

When the organopolysiloxane (A) is branched, the organopolysiloxane (A) can be prepared in various ways. For example, the organopolysiloxane (A) may be prepared as described above, e.g. via hydrosilylation of an unsaturated alcohol compound and an organohydrogenpolysiloxane where, in this embodiment, the organohydrogensiloxane itself is branched.

In other embodiments, the organopolysiloxane (A) is prepared via hydrosilylation of an initial organosiloxane, an organohydrogensiloxane, and an alcohol compound. The alcohol compound generally includes a terminal unsaturated group for participating the in the hydrosilylation reaction to give a carbinol functional group of the organopolysiloxane (A), examples of which are described above in regards to the carbinol functional group. When the organopolysiloxane (A) includes a single Q siloxy unit, the initial organosiloxane can be of formula $M^{Vi}_4Q$, where $M^{Vi}$ is of formula $(CH_3)_2(CH_2\!=\!CH)SiO_{1/2}$ and Q is of formula $SiO_{4/2}$. When the organopolysiloxane (A) includes two Q siloxy units, the initial organosiloxane can be of formula $M^{Vi}_3Q\text{-}QM^{Vi}_3$. The vinyl groups exemplified here can be replaced with any silicon-bonded alkenyl or alkynyl groups.

The organohydrogensiloxane can include pendent and/or terminal silicon-bonded hydrogen atoms, which influences structure of the resulting organopolysiloxane (A). In one embodiment, the initial organosiloxane and the organohydrogensiloxane are first reacted to give a reaction intermediary including residual silicon-bonded hydrogen atoms (or silicone hydride functionality), and the reaction intermediary is then reacted with the alcohol compound to give the organopolysiloxane (A). In other embodiments, the initial organosiloxane, the organohydrogensiloxane, and the alcohol compound are reacted simultaneously.

When the organohydrogensiloxane includes only terminal silicon-bonded hydrogen atoms, the organohydrogensiloxane forms a linear organosiloxane chain extending from each M siloxy unit of the initial organosiloxane after hydrosilylation with the ethylenically unsaturated group of each M siloxy unit, and is then capped with the alcohol compound (also via hydrosilylation), which gives the carbinol functional groups. For example, in these embodiments, and when the organopolysiloxane (A) include a single Q siloxy unit, the organopolysiloxane (A) may have the following formula: $Si\text{---}([OSiR_2]\text{-}D^1\text{-}[\text{---}SiR_2O_{1/2}][R_2SiO_{2/2}]_{m'}[XR_2SiO_{1/2}])_4$, where each R is independently selected and defined above, each $D^1$ is independently selected and defined above, each subscript m' is independently from 10 to 250, and each X is an independently selected carbinol functional group. When the organopolysiloxane (A) is formed with the organohydrogensiloxane including only terminal silicon-bonded hydrogen atoms, $Z^1$ is typically $(O_{1/2}SiR^1_2\text{-}D^1\text{-}R^1_2SiO_{1/2})$, where $R^1$ and $D^1$ are independently selected and defined above.

In certain embodiments when the organohydrogensiloxane includes only terminal silicon-bonded hydrogen atoms, the organopolysiloxane (A) has the formula:

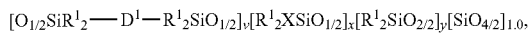

where $R^1$, $D^1$, X, v, x, and y are defined above.

As set forth in the average formula above for one exemplary embodiment of the organopolysiloxane (A), there may be more than 4 terminal M siloxy units despite there being a single Q siloxy unit. In contrast, the ratio of M to Q units is usually 4:1 or less in conventional organopolysiloxanes. The ratio of M to Q units is a function of additional branching that may be imparted in forming the organopolysiloxane (A) as described below.

For example, when the organohydrogensiloxane includes only pendent silicon-bonded hydrogen atoms, the organopolysiloxane (A) includes further branching. For example, in this embodiments, when the organopolysiloxane (A) includes a single Q unit, the organopolysiloxane (A) includes eight terminal M units rather than four (as in the embodiment above). In these embodiments, the moiety $Z^1$ indicated by subscript v is typically greater than 0, and most typically subscript v is 4.

As a specific example for the organohydrogensiloxane includes only pendent silicon-bonded hydrogen atoms, the organopolysiloxane (A) may have formula Si—$Y_4$, where each Y independently has the following structure:

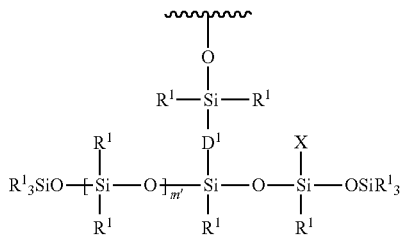

where each $R^1$, each $D^1$, each m' and each X is independently selected and defined above. It is to be appreciated that the $SiR_2O_{2/2}$ and $SiRXO_{2/2}$ units in Y may be in any location within the moiety represented by Y. for example, the $SiRXO_{2/2}$ units may be spaced from an M unit by another $SiR_2O_{2/2}$ unit. In these embodiments, the organopolysiloxane (A) may alternatively be represented by Si—$[OSiR_2$-$D^1$-$Y^1]$, where each $Y^1$ includes two $R_3SiO_{1/2}$ units, one $SiRXO_{2/2}$ unit, and from 1 to 250 $SiR_2O_{2/2}$ units, along with the —$SiRO_{2/2}$ unit linking $Y^1$ to $D^1$.

When the organohydrogensiloxane includes only pendent silicon-bonded hydrogen atoms, the organohydrogensiloxane forms a linear organosiloxane chain that caps each M siloxy unit of the initial organosiloxane after hydrosilylation with the ethylenically unsaturated group, but not extending away from the Q siloxy unit of the initial organosiloxane. When the organopolysiloxane (A) is formed with the organohydrogensiloxane including only pendent silicon-bonded hydrogen atoms, $Z^1$ is typically ($O_{1/2}SiR^1_2$-$D^1$-$R^1SiO_{2/2}$), where $R^1$ and $D^1$ are independently selected and defined above. $Z^1$ represents the M siloxy unit of the initial organosiloxane and the siloxy unit of the organohydrogensiloxane which hydrosilylated therewith.

In certain embodiments when the organohydrogensiloxane includes only pendent silicon-bonded hydrogen atoms, the organopolysiloxane (A) has the formula:

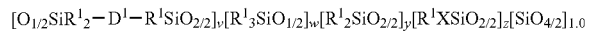

where $R^1$, $D^1$, X, v, w, y, and z are defined above.

In other embodiments, the organohydrogensiloxane has both pendent and terminal silicon-bonded hydrogen atoms.

In these embodiments, the organopolysiloxane (A) may include both $XR_2SiO_{1/2}$ and $XRSiO_{2/2}$ siloxy units, where X and R are independently selected and defined above.

In another specific embodiment, the organopolysiloxane (A) is prepared via a reaction of an initial organosiloxane, a cyclic organohydrogensiloxane, and an alcohol compound. In these embodiment, the cyclic organohydrogensiloxane undergoes a ring opening polymerization reaction and results in the formation of D siloxy units in the organopolysiloxane (A). In this embodiment, the initial organosiloxane does not need silicon-bonded ethylenically unsaturated groups as it does not undergo any hydrosilylation reaction. Thus, the initial organosiloxane can be of formula Si—$[OSiR_3]_4$, where each R is independently selected and defined above. When each R is methyl, the initial organosiloxane is $M_4Q$, or Si—$[OSi(CH_3)_3]_4$. However, the initial organosiloxane may be the same as that described above involving hydrosilylation such that the M siloxy units include silicon-bonded ethylenically unsaturated groups, e.g. vinyl groups.

The cyclic organohydrogensiloxane has the formula $(RHSiO_{2/2})_n$, where R is independently selected and defined above and n is an integer from 3 to 15. In the cyclic organohydrogensiloxane, each R is typically an independently selected alkyl group, and most typically, each R is a methyl group.

Subscript n is from 3 to 15, alternatively from 3 to 12, alternatively from 3 to 10, alternatively from 3 to 8, alternatively from 3 to 6, alternatively from 4-5. In addition, the (ii) cyclic organohydrogensiloxane may comprise a blend of different cyclic siloxanes, e.g. a blend of those where n is 4 and where n is 5. In specific embodiments, the (ii) cyclic organohydrogensiloxane is selected from the group of cyclotrisiloxanes, cyclotetrasiloxanes such as octamethylcyclotetrasiloxane, cyclopentasiloxanes such as decamethylcyclopentasiloxane, cyclohexasiloxanes, and combinations thereof.

Typically, the cyclic organohydrogensiloxane is utilized along with a cyclic siloxane that is free from silicon-bonded hydrogen atoms to selectively control the number of silicon-bonded hydrogen atoms present in a reaction intermediary formed from ring opening polymerization of the cyclic organohydrogensiloxane in the initial organosiloxane. The cyclic siloxane has the formula $(R_2SiO_{2/2})_n$, where R is independently selected and defined above and n is an integer from 3 to 15. In the cyclic siloxane, each R is typically an independently selected alkyl group, and most typically, each R is a methyl group. Subscript n is from 3 to 15, alternatively from 3 to 12, alternatively from 3 to 10, alternatively from 3 to 8, alternatively from 3 to 6, alternatively from 4-5.

One of skill in the art can optimize the number of silicon-bonded hydrogen atoms in the reaction intermediary based on a molar ratio of the cyclic organohydrogensiloxane to the cyclic siloxane. For example, in certain embodiments, it may be desirable for the reaction intermediary to include four silicon-bonded hydrogen atoms such that the organopolysiloxane (A) includes four silicon-bonded carbinol functional groups. In one embodiment, the molar ratio of the cyclic organohydrogensiloxane to the cyclic siloxane can be from 1:1 to 1:20, alternatively from 1:2 to 1:19, alternatively from 1:3 to 1:18, alternatively from 1:4 to 1:17, alternatively from 1:5 to 1:15, alternatively from 1:6 to 1:14, alternatively from 1:6 to 1:13, alternatively from 1:7 to 1:12, alternatively from 1:7 to 1:11.

The initial organosiloxane and the cyclic organohydrogensiloxane (and any cyclic organosiloxane) are reacted in the presence of a polymerization catalyst. Typically, the polymerization catalyst is an acid or a base such that the reaction between the initial organosiloxane and the cyclic organohydrogensiloxane (and any cyclic organosiloxane) is either an acid catalyzed or a base catalyzed reaction. As such, in certain embodiments, the polymerization catalyst may be selected from the group of strong acid catalysts, strong base catalysts, and combinations thereof. The strong acid catalyst may be trifluoromethane sulfonic acid and the like. The polymerization catalyst is typically a strong base catalyst. Typically, this strong base catalyst is a phosphazene catalyst, although other strong base catalysts, such as KOH, can be utilized in lieu of the phosphazene base catalyst.

The phosphazene catalyst, which generally includes at least one —(N=P<)— unit (i.e., a phosphazene unit) and is usually an oligomer having up to 10 such phosphazene units, for example having an average of from 1.5 up to 5 phosphazene units. The phosphazene catalyst may be, for example, a halophosphazene, such as a chlorophosphazene (phosphonitrile chloride), an oxygen-containing halophosphazene, an ionic derivative of a phosphazene such as a phosphazenium salt, particularly an ionic derivative of a phosphonitrile halide such as a perchlorooligophosphazenium salt, or a partially hydrolyzed form thereof.

In specific embodiments, the polymerization catalyst comprises a phosphazene base catalyst. The phosphazene base catalyst may be any known in the art but typically has the following chemical formula:

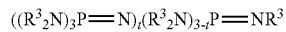

wherein each $R^3$ is independently selected from the group of a hydrogen atom, $R^1$, and combinations thereof, and t is an integer from 1 to 3. If $R^3$ is a $R^1$, then $R^3$ is typically an alkyl group having from 1 to 20, alternatively from 1 to 10, alternatively from 1 to 4, carbon atoms. The two $R^3$ groups in the any ($R^3{}_2$N) moiety may be bonded to the same nitrogen (N) atom and linked to complete a heterocyclic ring, typically having 5 or 6 members.

Alternatively, the phosphazene base catalyst may be a salt and have one of the following alternative chemical formulas:

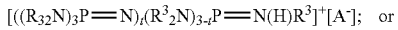

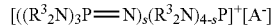

wherein each $R^3$ is independently selected and defined above, subscript t is defined above, subscript s is an integer from 1 to 4, and [A] is an anion and is typically selected from the group of fluoride, hydroxide, silanolate, alkoxide, carbonate and bicarbonate. In one embodiment, the phosphazene base is an aminophosphazenium hydroxide.

The reaction of the initial organosiloxane and the cyclic organohydrogensiloxane (and any cyclic organosiloxane) in the presence of the polymerization catalyst results in ring-opening of the cyclic organohydrogensiloxane (and any cyclic organosiloxane) and incorporation of D siloxy units into the reaction intermediary. The relative amounts of the cyclic organohydrogensiloxane (and any cyclic organosiloxane) utilized are a function of the desired content of D siloxy units in the reaction intermediary.

In certain embodiments, the initial organosiloxane and the cyclic organohydrogensiloxane (and any cyclic organosiloxane) are reacted at an elevated temperature, e.g. from 125 to 175° C., in the presence of a solvent. Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. A complexing agent, such as bis(trimethylsilyl)hydrogen phosphate may be utilized after the reaction to inhibit the activity of the polymerization catalyst. One of skill in the art can readily determine a catalytic quantity of the polymerization catalyst to be utilized, which is a function of its selection and reaction conditions. For example, in these embodiments, the reaction intermediary may have the following formula: $[R_3SiO_{1/2}]_4[RHSiO_{2/2}]_{v'}[R_2SiO_{2/2}]_y[SiO_{4/2}]_{1.0}$, where each R is independently selected and defined above, y is defined above, and v' is from 2 to 10, alternatively from 2 to 8, alternatively from 2 to 6, alternatively from 3 to 5.

The reaction intermediary formed via the initial organosiloxane and the cyclic organohydrogensiloxane (and any cyclic organosiloxane) can then be hydrosilylated with the alcohol compound to give the organopolysiloxane (A). Examples of the alcohol compound are described above, along with suitable hydrosilylation reaction catalysts. When the reaction intermediary has the formula set forth immediately above, the organopolysiloxane (A) formed therewith has the formula: $[R_3SiO_{1/2}]_4[RXSiO_{2/2}]_{v'}[R_2SiO_{2/2}]_y[SiO_{4/2}]_{1.0}$, where each R is independently selected and defined above, y is defined above, and v' is defined above, and each X is independently selected and defined above.

In certain embodiments, component (A) has a capillary viscosity (kinematic viscosity via glass capillary) at 25° C. of from 1 to 1,000, alternatively from 1 to 900, alternatively from 10 to 700, alternatively from 10 to 600, mPa·s. Capillary viscosity can be measured in accordance with Dow Corning Corporate Test Method CTM0004 of 20 Jul. 1970. CTM0004 is known in the art and based on ASTM D445, IP 71. Typically, when component (A) has pendent polyether groups as the carbinol functional groups, component (A) has a higher viscosity than when component (A) includes terminal carbinol functional groups that are not polyether groups (as set forth in the exemplary structures above). For example, when component (A) includes pendent polyether groups, the capillary viscosity at 25° C. is typically from 200 to 900, alternatively from 300 to 800, alternatively from 400 to 700, alternatively from 500 to 600 mPa·s. In contrast, when component (A) includes only terminal carbinol functional groups which are not polyether groups, component (A) may have a capillary viscosity at 25° C. of from greater than 0 to 250, alternatively from greater than 0 to 100, alternatively from greater than 0 to 75, alternatively from 10 to 75, alternatively from 25 to 75, mPa·s. In specific embodiments, component (A) has a capillary viscosity at 25° C. of from 25 to 1,000, alternatively from 50 to 800, alternatively from 60 to 700, alternatively from 70 to 600, alternatively from 80 to 500, alternatively from 90 to 400, mPa·s.

In these or other embodiments, component (A) may have an OH equivalent weight of from 100 to 2,000, alternatively from 200 to 1,750, alternatively from 300 to 1,500, alternatively from 400 to 1,200 g/mol. Methods of determining OH equivalent weight are known in the art based on functionality and molecular weight.

The composition comprises the organopolysiloxane (A) in an amount of from 50 to 99, alternatively from 55 to 99, alternatively from 60 to 99, alternatively from 65 to 99, alternatively from 70 to 99, alternatively from 75 to 99, weight percent based on the total weight of the composition.

The composition further comprises (B) a polyisocyanate. Suitable polyisocyanates for component (B) have two or more isocyanate functionalities, and include conventional aliphatic, cycloaliphatic, araliphatic and aromatic isocyanates. The polyisocyanate (B) may be selected from the group of diphenylmethane diisocyanates ("MDI"), polymeric diphenylmethane diisocyanates ("pMDI"), hydrogenated MDI (H12MDI), toluene diisocyanates ("TDI"), hexamethylene diisocyanates ("HDI"), dicyclohexylmethane diisocyanates ("HMDI"), isophorone diisocyanates ("IPDI"), cyclohexyl diisocyanates ("CHDI"), naphthalene diisocyanate ("NDI"), phenyl diisocyanate ("PDI"), and combinations thereof. In certain embodiments, the polyisocyanate (B) comprises, consists essentially of, or is a pMDI. In one embodiment, the polyisocyanate (B) is of the formula OCN—R'—NCO, wherein R' is an alkyl moiety, an aryl moiety, or an arylalkyl moiety. In this embodiment, the polyisocyanate (B) can include any number of carbon atoms, typically from 4 to 20 carbon atoms.

Specific examples of suitable polyisocyanates for component (B) include: alkylene diisocyanates with 4 to 12 carbons in the alkylene moiety such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates, such as 1,3- and 1,4-cyclohexane diisocyanate as well as any mixtures of these isomers, 1-isocyanato-3,3,5-trimethyl-5-isocyanatomethylcyclohexane, 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures; and aromatic diisocyanates and polyisocyanates, such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates, as well as mixtures of MDI and toluene diisocyanate (TDI).

The polyisocyanate (B) may include or be a modified multivalent isocyanate, i.e., a product obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of from 5 to 40, alternatively from 10 to 40, alternatively from 15 to 33.6, parts by weight based on the total weight, e.g. with low molecular weight diols, triols, dialkylene glycols, trialkylene glycols, or polyoxyalkylene glycols with a molecular weight of up to 6,000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the polyisocyanate (B) and produced from polyester polyols and/or polyether polyols; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of from 15 to 33.6 parts by weight based on the total weight of the (2) isocyanate component, may also be suitable, e.g. based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

It is to be appreciated that the polyisocyanate (B) may include any combination of two or more polyisocyanates that are different from one another based on functionality, molecular weight, viscosity, or structure. In specific embodiments, the polyisocyanate (B) comprises, consists essentially of, or is, a pMDI.

The polyisocyanate (B) typically has a functionality of from 2.0 to 5.0, alternatively from 2.0 to 4.5, alternatively from 2.0 to 4.0, alternatively from 2.0 to 3.5.

In these or other embodiments, the polyisocyanate (B) has an NCO by weight of from 15 to 60, alternatively from 15 to 55, alternatively from 20 to 48.5, wt. %. Methods of determining content of NCO by weight are known in the art based on functionality and molecular weight of the particularly isocyanate.

The polyisocyanate (B) is typically present in the composition in an amount to provide an isocyanate index of from 75 to 200, alternatively from 75 to 130, alternatively from 75 to 125, alternatively from 85 to 125, alternatively from 90 to 120, alternatively from 95 to 120, alternatively from 100 to 120, alternatively from 80 to 120, alternatively from 85 to 115, alternatively from 90 to 110, alternatively from 90 to 105, alternatively from 90 to 100. Isocyanate index is the molar ratio of NCO to isocyanate-reactive hydrogen functional groups, times 100. Isocyanate index and methods of its calculation are well known in the art.

In certain embodiments, the composition additionally comprises a (C) a catalyst. Typically, the composition comprises the catalyst (C). However, components (A) and (B) are typically reactive in the absence of the catalyst (C) such that the catalyst (C) is utilized to accelerate the reaction at lower temperatures, which is typically desired in preparing release coatings.

In one embodiment, the catalyst (C) comprises a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the catalyst (C) comprises dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, PA, under the trademark DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-shexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof.

Yet further examples of other suitable catalysts, specifically tertiary amine catalysts, include dimethylaminoethanol, dimethylaminoethoxyethanol, triethylamine, N,N,N',N'-tetramethylethylenediamine, triethylenediamine (also known as 1,4-diazabicyclo[2.2.2]octane), N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylaminoethyl)ether, N,N-dimethylcyclohexylamine ("DMCHA"), N,N,N',N',N''-pentamethyldiethylenetriamine, 1,2-dimethylimidazole, 3-(dimethylamino) propylimidazole, 2,4,6-tris (dimethylaminomethyl) phenol, and combinations thereof. The catalyst (C) can comprise delayed action tertiary amine based on 1,8-diazabicyclo[5.4.0]undec-7-ene ("DBU"). Alternatively or in addition, the catalyst (C) can comprise N,N,N'-trimethyl-N'-hydroxyethyl-bisaminoethylether and/or ethylenediamine. The tertiary amine catalysts can be further modified for use as delayed action catalysts by addition of approximately the same stoichiometric amount of acidic proton containing acid, such as phenols or formic acid. Such delayed action catalysts are commercially available from Air Products and Evonik.

Additional examples of other suitable catalysts include metal chelates, such as aluminum acetylacetonate, TiCH, titanium (IV)oxide acetylacetonate, bismuth(III) acetate, aluminum di(isopropoxide)acetoacetic ester, and combinations thereof.

The catalyst (C) may be utilized neat or disposed in a vehicle. Vehicles are known in the art and further described below as an optional component for the composition. If the vehicle is utilized and solubilizes the catalyst (C), the vehicle may be referred to as a solvent. The vehicle can be isocyanate-reactive, e.g. an alcohol-functional vehicle, such as dipropylene glycol.

The catalyst (C) can be utilized in various amounts. The catalyst (C) may include any combination of different catalysts.

The composition may optionally comprise at least one additive selected from (D) an inhibitor, (E) a chain extender, (F) a vehicle, (G) an anchorage additive, (H) an anti-mist additive, and/or (I) a release modifier. In certain embodiments, the composition is substantially free from conventional organic polyols, e.g. polyether and/or polyester polyols. Conventional organic polyols do not include siloxane backbones, unlike component (A). By substantially free, with reference to the composition being substantially free from conventional polyols, it is meant that the composition comprises conventional organic polyols in an amount of less than 4, alternatively less than 3, alternatively less than 2, alternatively less than 1, alternatively 0, weight percent based on the total weight of the composition.

In certain embodiments, the composition further comprises the inhibitor (D). The inhibitor (D) may be used for altering the reaction rate or curing rate of the composition, as compared to a composition containing the same starting materials but with the inhibitor (D) omitted. The inhibitor (D) is exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclo-octadiene, divinyltetramethyldisiloxane; alcohols such as benzyl alcohol; and a combination thereof. Alternatively, the inhibitor (D) may be selected from the group consisting of acetylenic alcohols (e.g., 1-ethynyl-1-cyclohexanol) and maleates (e.g., diallyl maleate, bis maleate, or n-propyl maleate) and a combination of two or more thereof. Another example of the inhibitor (D) is acetylacetone.

Alternatively, the inhibitor (D) may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the inhibitor (D) is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor (D) may be prepared by methods known in the art, such as silylating an acetylenic alcohol described above by reacting it with a chlorosilane in the presence of an acid receptor.

In specific embodiments, the inhibitor (D) comprises or is selected from an acetylenic alcohol, a silylated acetylenic alcohol, an ene-yne compound, a triazole, a phosphine, a mercaptan, a hydrazine, an amine, a fumarate, a maleate, an ethers, carbon monoxide, and a combination of two or more thereof.

The amount of the inhibitor (D) present in the composition will depend on various factors including the desired pot life of the composition, whether the composition will be a one part composition or a multiple part composition, the particular inhibitor used, and the selection and amount of components (A)-(C). However, when present, the amount of the inhibitor (D) may be 0% to 1%, alternatively 0% to 5%, alternatively 0.001% to 1%, alternatively 0.01% to 0.5%, and alternatively 0.0025% to 0.025%, based on the total weight of the composition.

In certain embodiments, the composition further comprises the chain extender (E). In certain embodiments, the chain extender (E) comprises an organopolysiloxane chain extender. When utilized, the organopolysiloxane chain extender is distinguished from component (A). In specific embodiments, the organopolysiloxane chain extender is a linear organopolysiloxane including two terminal silicon-bonded carbinol functional groups. When the organopolysiloxane chain extender is utilized and comprises a linear organopolysiloxane including two terminal silicon-bonded carbinol functional groups, component (A) may differ from component (E) based on component (A) being branched, component (A) including an average of at least three silicon-bonded carbinol functional groups per molecule, etc.

In certain embodiments, the composition further comprises the organopolysiloxane chain extender, and the organopolysiloxane chain extender has the formula $R_2XSiO(SiR_2O_{2/2})_{n'}SiR_2X$, where each R is independently selected and defined above, X is independently selected and defined above, and subscript n' is from 3 to 250, alternatively from 5 to 200, alternatively from 5 to 150, alternatively from 5 to 100, alternatively from 5 to 50. However, the organopolysiloxane chain extender may include pendent silicon-bonded carbinol functional groups, or both pendent and terminal silicon-bonded carbinol functional groups.

In other embodiments, the chain extender (E) may be organic or free from siloxane bonds. In such embodiments, the chain extender (E) may be any conventional chain extender (E) from polyurethane and/or polyisocyanurate compositions. Typically, in such embodiments, the chain extender (E) includes two hydroxyl groups per molecule. The initiator may be selected from, for example: neopentylglycol; 1,2-propylene glycol; alkanediols, such as 1,6-hexanediol, 1,4-butanediol, 1,3-butane diol, 2,3-butanediol, 1,3-propanediol, 1,2-propanediol, 1,5-pentanediol, 2-methylpropane-1,3-diol, 1,4-cyclohexane diol, 1,3-cyclohexanedimethanol, 1,4-cyclohexanedimethanol, 2,5-hexanediol; ethylene glycol; diethylene glycol; triethylene glycol; and combinations thereof.

Typically, when the composition further comprises the chain extender (E), the chain extender (E) comprises the organopolysiloxane chain extender for purposes of miscibility with component (A). However, depending on the presence of component (F), described below, miscibility may be improved between component (A) and other forms of the chain extender (E), including the organic chain extenders described above. Combinations of different chain extenders may be utilized.

When utilized, the chain extender (E) may be utilized in an amount of from greater than 0 to 50, alternatively from 10 to 50, alternatively from 20 to 40, parts by weight based on 100 parts by weight of component (A).

In certain embodiments, the composition further comprises the vehicle (F), which can also be referred to as a carrier vehicle. The vehicle (F) typically solubilizes the components of the composition and, if the components solubilize, the vehicle (F) may be referred to as a solvent. Suitable vehicles include silicones, both linear and cyclic, organic oils, organic solvents and mixtures of these.

Typically, the vehicle (F), if present in the composition, is an organic liquid. Organic liquids include those considered oils or solvents. The organic liquids are exemplified by, but not limited to, aromatic hydrocarbons, aliphatic hydrocarbons, alcohols having more than 3 carbon atoms, aldehydes, ketones, amines, esters, ethers, glycols, glycol ethers, alkyl halides and aromatic halides. Hydrocarbons include isododecane, isohexadecane, Isopar L (C11-C13), Isopar H(C11-C12), hydrogenated polydecene, aromatic hydrocarbons, and halogenated hydrocarbons. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), diethylene glycol butyl ether, octyldodecyl neopentanoate, diisobutyl adipate, diisopropyl adipate, propylene glycol dicaprylate/dicaprate, octyl ether, and octyl palmitate. Additional organic fluids suitable as a stand-alone compound or as an ingredient to the vehicle (F) include fats, oils, fatty acids, and fatty alcohols. The vehicle (F) may also be a low viscosity organopolysiloxane or a volatile methyl siloxane or a volatile ethyl siloxane or a volatile methyl ethyl siloxane having a viscosity at 25° C. in the range of 1 to 1,000 mm²/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

In specific embodiments, the vehicle (F) is selected from polyalkylsiloxanes; tetrahydrofuran; mineral spirits; naphtha; an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether; or a combination thereof.

In one embodiment, the vehicle (F) is a polar vehicle. In one specific embodiment when the vehicle (F) is polar, the vehicle (F) comprises, alternatively is, acetone.

The amount of the vehicle (F) will depend on various factors including the type of vehicle selected and the amount and type of other components present in the composition. However, the amount of the vehicle (F) in the composition may be from 0 to 80, alternatively 1 to 50, alternatively from 1 to 40, alternatively from 1 to 35, alternatively from 1 to 30, alternatively from 5 to 30, alternatively from 10 to 30, alternatively from 15 to 25, weight percent based on the total weight of the composition. The vehicle (F) may be added during preparation of the composition, for example, to aid mixing and delivery. All or a portion of the vehicle (F) may optionally be removed after the composition is prepared, including prior to and/or contemporaneous with preparing the release coating from the composition.

In certain embodiments, the composition further comprises the anchorage additive (G). Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149; U.S. Patent Application Publication Numbers 2003/0088042, 2004/0254274, and 2005/0038188; and European Patent 0 556 023.

Further examples of suitable anchorage additives include a transition metal chelate, a hydrocarbonoxysilane such as an alkoxysilane, a combination of an alkoxysilane and a hydroxy-functional polyorganosiloxane, or a combination thereof. The anchorage additive (G) may be a silane having at least one substituent having an adhesion-promoting group, such as an epoxy, acetoxy or acrylate group. The adhesion-promoting group may additionally or alternatively be any hydrolysable group. Alternatively, the anchorage additive (G) may comprise a partial condensate of such a silane, e.g. an organopolysiloxane having an adhesion-promoting group. Alternatively still, the anchorage additive (G) may comprise a combination of an alkoxysilane and a hydroxy-functional polyorganosiloxane.

Alternatively, the anchorage additive (G) may comprise an unsaturated or epoxy-functional compound, e.g. an unsaturated or epoxy-functional silane. The anchorage additive (G) may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The anchorage additive (G) may also comprise the reaction product or partial reaction product of one or more of these compounds. For example, in a specific embodiment, the anchorage additive (G) may comprise the reaction product or partial reaction product of vinyltriacetoxysilane and 3-glycidoxypropyltrimethoxysilane. Alternatively or in addition, the anchorage additive (G) may comprise alkoxy or alkenyl functional siloxanes.

Alternatively, the anchorage additive (G) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The anchorage additive (G) may comprise a combination of an epoxy-functional alkoxysilane and an epoxy-functional siloxane. For example, the anchorage additive (G) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Examples of acetoxysilanes suitable for use as the anchorage additive (G) include tetraacetoxysilanes, organotriacetoxysilanes, diorganodiacetoxysilanes, and combinations thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. In some embodiments, the anchorage additive (G) comprises organotriacetoxysilanes, for example a mixture comprising methyltriacetoxysilane and ethyltriacetoxysilane.

Examples of aminofunctional alkoxysilanes suitable for use in or as the anchorage additive (G) are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3 SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and combinations thereof.

Examples of oximosilanes suitable for the anchorage additive (G) include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Examples of ketoximosilanes suitable for the anchorage additive (G) include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)

silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

Alternatively, the anchorage additive (G) may comprise a transition metal chelate. Suitable transition metal chelates include titanates, zirconates such as zirconium acetylacetonate, aluminum chelates such as aluminum acetylacetonate, and combinations thereof. Alternatively, the anchorage additive (G) may comprise a combination of a transition metal chelate with an alkoxysilane, such as a combination of glycidoxypropyltrimethoxysilane with an aluminum chelate or a zirconium chelate.

The particular amount of the anchorage additive (G) present in the composition, if utilized, depends on various factors including the type of substrate and whether a primer is used. In certain embodiments, the anchorage additive (G) is present in the composition in an amount of from 0 to 2 parts by weight, per 100 parts by weight of component (B). Alternatively, the anchorage additive (G) is present in the composition in an amount of from 0.01 to 2 parts by weight, per 100 parts by weight of component (B).

In certain embodiments, the composition further comprises the anti-mist additive (H). The anti-mist additive (H) may be utilized in the composition to reduce or suppress silicone mist formation in coating processes, particularly with high speed coating equipment. The anti-mist additive (H) may be any compound or component suitable for reducing, minimizing, or eliminating misting during applications of the composition. In one embodiment, the anti-mist additive (H) comprises or is a reaction product of an organohydrogensilicon compound, an oxyalkylene compound or an organoalkenylsiloxane with at least three silicon bonded alkenyl groups per molecule, and a suitable catalyst. In a specific embodiment, the anti-mist additive (H) comprises a Q-branched dimethylvinyl terminated organopolysiloxane. In another specific embodiment, the anti-mist additive (H) comprises an MDQ resin. The anti-mist additive (H) may have a viscosity of from 30,000 to 50,000, alternatively from 35,000 to 45,000, centipoise at 25° C. Suitable anti-mist additives are disclosed, for example, in U.S. Patent Application 2011/0287267; U.S. Pat. Nos. 8,722,153; 6,586,535; and 5,625,023.

The amount of the anti-mist additive (H) utilized in the composition and its selection will depend on various factors including the amount and type of other starting materials selected for the composition. For example, when component (A) is linear or only slightly branched, the anti-mist additive (H) may be utilized and may have a highly branched or resinous structure. However, when component (A) is branched or resinous, then the anti-mist additive (H) may be utilized and may be linear or only partly branched. The anti-mist additive (H) is typically utilized in an amount of from 0% to 10%, alternatively 0.1% to 3%, based on the total weight of the composition. This amount excludes that associated with component (A), and only relates to the anti-mist additive (H) that is separate and distinct from component (A).

In certain embodiments, the composition further comprises the release modifier (I), which may be utilized in the composition to control (decrease) the level of release force (the adhesive force between the release coating formed from the composition and an adhered thereto, such as a label including a pressure sensitive adhesive). Release coatings having the required or desired release force can be formulated from a modifier-free composition by adjusting the level or concentration of the release modifier (I). Examples of suitable release modifiers for component (I) include trimethylsiloxy-terminated dimethyl, phenylmethylsiloxanes. Alternatively, the release modifier (I) may be a condensation reaction product of an organopolysiloxane resin having hydroxyl or alkoxy groups and a diorganopolysiloxane with at least one hydroxyl or hydrolyzable group. Examples of suitable release modifiers are disclosed, for example, in U.S. Pat. No. 8,933,177 and U.S. Patent Application Publication 2016/0053056.

The release coating formed with the composition is not a foam. As understood in the art, conventional reactions between an isocyanate and an isocyanate-reactive component can be carried out in the presence of a blowing agent to give a foam. Blowing agents can be classified as physical and chemical blowing agents. Physical blowing agents undergo a phase change from a liquid to a gaseous state during exposure to atmospheric pressure and an elevated temperature, e.g. ≥100° C., associated with cure. The phase change is typically associated with a boiling point temperature of the physical blowing agent. Chemical blowing agents, in contrast, react with one or more other components in the composition, or with other molecules of the chemical blowing agent, to release gas a byproduct. Such blowing agents are typically utilized in forming polyurethane and/or polyisocyanurate foams. However, the release coating formed with the composition is not a foam, and in certain embodiments, the composition is free from physical blowing agents, chemical blowing agents, or both physical and chemical blowing agents. As understood in the art, determining whether a component constitutes a physical blowing agent is a function of processing parameters, including temperature, in forming the release coating with the composition (i.e., based on physical properties of the component and whether it will boil or volatilize during formation of the release coating). For example, certain components of the composition may volatilize at particularly high processing temperatures (e.g. >120° C.), but not at the processing temperatures utilized to prepare the release coating with the composition such that the composition is free from blowing agents. As introduced above, the composition is typically free from chemical blowing agents. Chemical blowing agents are distinguished from components (A), (B), and optional components (C)-(I). Depending on a selection of these components, gas could at least be a byproduct of the reaction in forming the release coating. However, if any gasses are formed as byproducts in preparation of the release coating, the gasses are generated at a much lesser level than gasses formed with conventional chemical blowing agents such that the release coating is not a foam.

Other optional components may be present in the composition, including, for example, reactive diluents, fragrances, preservatives, colorants, dyes, pigments, anti-oxidants, heat stabilizers, flame retardants, flow control additives, biocides, fillers (including extending and reinforcing fillers), surfactants, thixotroping agents, pH buffers, etc. The composition may be in any form and may be incorporated into further compositions.

Alternatively, the composition and release coating formed therefrom may be free of particulates or contains only a limited amount of particulate (e.g., filler and/or pigment), such as 0 to 30% by weight of the composition. Particulates can agglomerate or otherwise stick to the coater equipment used to form the release coating. In addition, particulates can hinder optical properties, for example transparency, of the release coating and of the release liner formed therewith, if optical transparency is desired. The particulates may be prejudicial to the adherence of an adhered.

In certain embodiments, the composition is free from fluoroorganosilicone compounds. It is believed that, during the cure, a fluorocompound, because of its low surface tension, may rapidly migrate to the interface of the composition or the release coating formed therewith and a substrate on which the composition is applied and the release coating is formed, for example a composition/PET film interface. Such migration may prevent adherence of the release coating (prepared by curing the composition) to the substrate by making a fluorine containing barrier. By making a barrier, the fluoroorganosilicone compounds may prevent any component of the composition from reacting at the interface, impacting curing and related properties. Moreover, fluoroorganosilicone compounds are usually expensive.

The composition in its curable form may be prepared by combining components (A)-(B), as well as any optional components, described above, in any order of addition, optionally with a master batch, and optionally under shear. As described in greater detail below, the composition may be a one-part composition, a two component or 2K composition, or a multi-part composition. For example, the composition may comprise an isocyanate-reactive component and an isocyanate component. Component (A) is present in the isocyanate-reactive component, and component (B) is present in the isocyanate component. The catalyst (C) is typically present in the isocyanate-reactive component, but could alternatively be present in a third component separate from the isocyanate-reactive component and the isocyanate component. In certain embodiments, the isocyanate component consists of the polyisocyanate (B), and the remaining components are present in the isocyanate-reactive component. The components are typically combined to give the composition as a bath when forming the release coating therewith.

A method of preparing a coated substrate with the composition comprises applying, i.e., disposing, the composition on the substrate. The method further comprises curing the composition on the substrate, which results in the formation of the release coating on the substrate to give the coated substrate. Curing may be performed by heating at an elevated temperature, e.g., from 50 to 180, alternatively from 50 to 120, alternatively from 50 to 90, alternatively from 70 to 90° C., to give the coated substrate. One skilled in the art would be able to select an appropriate temperature depending on various factors including the selection of the components in the composition and the substrate composition or material of construction. The composition cures at lower temperatures as compared to conventional compositions utilized to prepare conventional release coatings, thus allowing for reduced energy consumption and use of different types of substrates that may soften or deform at elevated temperatures.

The composition may be disposed or dispensed on the substrate in any suitable manner. Typically, the composition is applied in wet form via a wet coating technique. The composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the composition on the substrate results in a wet deposit on the substrate, which is subsequently cured to give the coated substrate, which comprises a cured film, i.e., the release coating, formed from the composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the wet deposit. The substrate may optionally have a continuous or non-continuous shape, size, dimension, surface roughness, and other characteristics. Alternatively, the substrate may have a softening point temperature at the elevated temperature. However, the composition and method are not so limited.

Alternatively, the substrate may comprise a plastic, which maybe a thermosetting and/or thermoplastic. However, the substrate may alternatively be or comprise glass, metal, cellulose (e.g. paper), wood, cardboard, paperboard, a silicone, or polymeric materials, or a combination thereof.

Specific examples of suitable substrates include paper substrates such as Kraft paper, polyethylene coated Kraft paper (PEK coated paper), thermal paper, and regular papers; polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The composition, or wet deposit, is typically cured at the elevated temperature for a period of time. The period of time is typically sufficient to effect curing, i.e., cross-linking, of the composition. The period of time may be from greater than 0 to 8 hours, alternatively from greater than 0 to 2 hours, alternatively from greater than 0 to 1 hour, alternatively from greater than 0 to 30 minutes, alternatively from greater than 0 to 15 minutes, alternatively from greater than 0 to 10 minutes, alternatively from greater than 0 to 5 minutes, alternatively from greater than 0 to 2 minutes, alternatively from greater than 0 to 90 seconds, alternatively from greater than 0 to 80 seconds, alternatively from greater than 0 to 70 seconds, alternatively from greater than 0 to 60 seconds. The period of time depends on various factors including on the elevated temperature is utilized, the temperature selected, desired film thickness, and the presence of absence of any vehicle in the composition.

Curing the composition typically has a dwell time of from 0.1 second to 50 seconds; alternatively from 1 second to 10 seconds; and alternatively from 0.5 second to 30 seconds. Dwell time selected may depend on the substrate selection, temperature selected, and line speed. Dwell time, as used herein, refers to the time during which the composition, or wet deposit, is subjected to the elevated temperature. Dwell time is distinguished from cure time, as there may be ongoing curing even after the composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on the optional presence and selection of the vehicle (F), curing the composition may also include the step of drying. For example, when the composition includes the vehicle (F), the step of curing typically also removes drying or removing the vehicle (F) from the composition. Drying may be contemporaneous with curing or may be separate from curing.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of components selected in the composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the composition on the substrate, may have varying dimensions, including relative thicknesses of the film and the substrate. The film has a thickness that may vary depending upon its end use application. The film may have a thickness of greater than 0 to 4,000 μm, alternatively greater than 0 to 3,000 μm, alternatively greater than 0 to 2,000 μm, alternatively greater than 0 to 1,000 μm, alternatively greater than 0 to 500 μm, alternatively greater than 0 to 250 μm. However, other thicknesses are contemplated, e.g. 0.1 to 200 μm. For example, the thickness of the film may be 0.2 to 175 μm; alternatively 0.5 to 150 μm; alternatively 0.75 to 100 μm; alternatively 1 to 75 μm; alternatively 2 to 60 μm; alternatively 3 to 50 μm; and alternatively 4 to 40 μm. Alternatively, when the substrate is plastic, the film may have a thickness of greater than 0 to 200, alternatively greater than 0 to 150 μm, and alternatively greater than 0 to 100 μm.

If desired, the film may be subjected to further processing depending upon its end use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, or electrical applications. However, the composition may be utilized in end use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may having a film disposed thereon for double sided tapes or adhesives.

Alternatively, when the composition will be formulated as a release coating composition, e.g. for forming a release coating or liner, the release coating composition may be prepared by mixing the components together, for example, to prepare a one part composition. However, it may be desirable to prepare a release coating composition as a multiple part composition, in which components having carbinol functionality (e.g. component (A)) and components having isocyanate functionality (e.g. component (B)) are stored in separate parts, until the parts are combined at the time of use (e.g., shortly before application to a substrate). When the composition is the release coating composition, the release coating composition can utilized to form the coated substrate as described above, and the release coating is formed by applying and curing the release coating composition on the substrate, e.g. a surface of the substrate.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calender paper, or clay coated kraft. The release coating composition can alternatively be applied to a metal foil substrate, for example aluminum foil.

In certain embodiments, the method of preparing the coated substrate may further comprise treating the substrate before applying or disposing the release coating composition on the substrate. Treating the substrate may be performed by any convenient means such as a plasma treatment or a corona discharge treatment. Alternatively, the substrate may be treated by applying a primer. In certain instances, anchorage of the release coating may be improved if the substrate is treated before forming the release coating thereon from the release coating composition.

When the release coating composition includes the vehicle (F), the method may further comprise removing the vehicle (F), which may be performed by any conventional means, such as heating at 50° C. to 100° C. for a time sufficient to remove all or a portion of the vehicle (F). The method may further comprise curing the release coating composition to form the release coating on a surface of the substrate. Curing may be performed by any conventional means such as heating at 100° C. to 200° C.

Under production coater conditions, cure can be effected in a residence time of 1 second to 6 seconds, alternatively 1.5 seconds to 3 seconds, at an air temperature of 120° C. to 150° C. Heating can be performed in an oven, e.g., an air circulation oven or tunnel furnace or by passing the coated film around heated cylinders.

The following examples are intended to illustrate the invention and are not to be viewed in any way as limiting to the scope of the invention. Certain components utilized in the Examples are set forth in Table 1 below, followed by characterization and evaluation procedures also used in the Examples.

Materials

A brief summary is provided in Table 1 below, setting forth information as to certain abbreviations, shorthand notations, and components utilized in the Examples. Degree of polymerization (DP) is typically reported as number average DP, e.g. from NMR, IR, and/or GPC (e.g. relative to standards, such as polystyrene).

TABLE 1

Materials Utilized

| Material Ref. | Description |
| --- | --- |
| Initial Organosiloxane 1 | A 50/50 blend of $QM_4^{Vi}$ and $Q_2M_6^{Vi}$. |
| Initial Organosiloxane 2 | $M_4Q$ |
| Alcohol Compound | Allyl-oxy-ethanol |
| Organosilicon Compound | An organohydrogensiloxane of formula $MD_{22}D_2^HM$ |
| Hydrosilylation Catalyst | Karstedt's catalyst |
| Organopolysiloxane 1 | As synthesized in Preparation Example 1 |
| Organopolysiloxane 2 | As synthesized in Preparation Examples 2-3 |
| Cyclic Organohydrogensiloxane | $D_4^H$ $(CH_3(H)SiO)_4$ |
| Cyclic Siloxane | $D_4$ $((CH_3)_2SiO)_4$ |
| Chain Extender | A polydimethylsiloxane of formula $M^XD_{17}M^X$ having a carbinol functional group at each molecular terminal |
| Isocyanate 1 | Hexamethylene diisocyanate |
| Isocyanate 2 | A polymeric MDI having a nominal functionality of 2.7 and an NCO content by weight of 31% (as determined in accordance with ASTM D5155) |
| Inhibitor 1 | Acetylacetone (AcAc) |
| Inhibitor 2 | 1-ethynylcyclohexanol (ETCH) |
| Catalyst 1 | Dibutyltin dilaurate |
| Catalyst 2 | Tin (II) 2-ethylhexanoate |
| Catalyst 3 | Titanium (IV)oxide acetylacetonate $(Ti(AcAc)_2)$ |
| Catalyst 4 | Bismuth(III) acetate |
| Catalyst 5 | Aluminum di(isopropoxide)acetoacetic ester (AlCH) |
| Catalyst 6 | TiCH in Solvent 1 |
| Equilibrium Catalyst | A bead form, macroreticular, sulfonic acid ion exchange resin |
| Solvent 1 | Acetone |
| Solvent 2 | Isopropyl alcohol (IPA) |
| M | $[(CH_3)_3SiO_{1/2}]$ |
| $M^{Vi}$ | $[(CH_3)_2(CH_2=CH)SiO_{1/2}]$ |
| $M^X$ | $[(CH_3)_2(HOCH_2CH_2OCH_2CH_2CH_2)SiO_{1/2}]$ |
| D | $[(CH_3)_2SiO_{2/2}]$ |
| $D^H$ | $[(CH_3)HSiO_{2/2}]$ |
| Q | $SiO_{4/2}$ |
| Vi | Vinyl (—CH=$CH_2$) |

Equipment and Characterization Parameters

The following equipment and characterization procedures/parameters were used to evaluate various physical properties of the compounds prepared in the examples below.

Nuclear Magnetic Resonance Spectroscopy (NMR)

Nuclear magnetic resonance (NMR) spectra were obtained on a NMR BRUKER AVIII (400 MHz), using a silicon-free 10 mm tube and $CDCl_3/Cr(AcAc)_3$ solvent. Chemical shifts for $^{29}Si$-NMR spectra are referenced to internal solvent resonance and are reported relative to tetramethylsilane.

Gel Permeation Chromatography (GPC)

Gel permeation chromatography (GPC) analysis was conducted on an Agilent 1260 Infinity II chromatograph equipped with a triple detector composed of a differential refractometer, an online differential viscometer, a low angle light scattering (LALS: 15° and 90° angles of detection), and a column (2 PL Gel Mixed C, Varian). Toluene (HPLC grade, Biosolve) was used as mobile phase, at a flow rate of 1 mL/min.

Hydroxyl Content

Hydroxyl content was determined via titration. In particular, hydroxyl groups were esterified by reaction with phthalic anhydride in a pyridine medium at 110° C. The esterification reaction was catalyzed by 1-methylimidazole. In order to improve solubility, 4 mL THF was utilized in each case. The excess phthalic anhydride was hydrolyzed with water and the phthalic acid formed was titrated potentiometrically with standard sodium hydroxide solution. The hydroxyl content was calculated from the difference in titration of the blank and the sample solution and is expressed as % hydroxyl (% OH, wt/wt) or hydroxyl number (mg KOH/g sample).

GC-MS

Residual reactants when forming the Organopolysiloxane 1 and 2 were measured and determined by GC-MS on Agilent 6890N Gas Chromatography system equipped with DB-5 ms column (Agilent 122-5533, 30 m×250 µm×1.0 µm).

Dynamic Viscosity (DV)

Dynamic viscosity (DV) was measured with a Brookfield DV-Ill Ultra Programmable Rheometer equipped with a CPA-52Z spindle, using a sample volume of 0.5 mL, at a temperature of 25° C.

X-Ray Fluorescence (XRF)

X-Ray Fluorescence (XRF) was conducted on an Oxford Instruments Lab-X 3500 Benchtop XRF analyzer.

Coat Weight (CW)

Coat weight of each release coating was measured via XRF using uncoated PET as a blank. Coat weight was measured in accordance with FINAT Test Method No. 7 (FINAT Technical Handbook, 7$^{th}$ Edition, 2005).

Coat Weight After Rub-off ($CW_{RO}$)

After measuring Coat Weight (CW) of a given release coating, the release coating was subjected to an abrasion test. Specifically, each release coating was rubbed for 30 cycles at a speed of 30 cycles/minute via an Elcometer 1720 Abrasion Tester. After the abrasion test, the Coat Weight After Rub-off ($CW_{RO}$) was measured via XRF.

Anchorage Rate (RO %)

Anchorage rate (RO %) was calculated as follows: ($CW_{RO}$/CW)×100.

Release Force (RF-RT)

To measure release force at room temperature, a 180° peeling test was utilized. In particular, a Tesa 7475 standard tape was laminated on each release coating to give a laminated sample, and a loaded weight of 20 g/cm² was disposed on each laminated sample for 20 hours at room temperature. After 20 hours, the loaded weight was removed. After 30 minutes, the release force was measured via a ChemInstruments AR-1500 in accordance with FINAT Test Method No. 10 (FINAT Technical Handbook 7$^{th}$ edition, 2005).

Aged Release Force (RF-70° C.)

To measure aged release force at 70° C., a 180° peeling test was utilized. In particular, a Tesa 7475 standard tape was laminated on each release coating to give a laminated sample, and a loaded weight of 20 g/cm² was disposed on each laminated sample for 20 hours at 70° C. After 20 hours, the loaded weight was removed. After 30 minutes at room temperature, the release force was measured via a ChemInstruments AR-1500 in accordance with FINAT Test Method No. 10 (FINAT Technical Handbook 7$^{th}$ edition, 2005).

Subsequent Adhesive Strength (SAS)

SAS is an indicator of migration, and was measured by first laminating a Nitto Denko 31B tape on each release coating to give a laminated sample, and disposing a loaded weight of 20 g/cm² on each laminated sample for 20 hours at 70° C. After 20 hours, the loaded weight was removed. After 30 minutes at room temperature, each laminated sample was disposed on a PET substrate for 1 hour. Then, release force was measured via a ChemInstruments AR-1500 to give a $RF_{release}$ value. The same procedure was carried out for each release coating but with a PTFE substrate rather than a PET substrate, and the resulting release force is referred to as a $RF_{PTFE}$ value. SAS was calculated by the formula $RF_{release}/RF_{PTFE}×100\%$ in accordance with FINAT Test Method No. 11 (FINAT Technical Handbook 7$^{th}$ edition, 2005).

Preparation Example 1: Synthesis of Organopolysiloxane Having Carbinol Functionality 300 grams of Organosilicon Compound and 13 grams of Initial Organosiloxane 1 were disposed in a 500 mL 3-neck flask and mixed for five minutes. Then, 0.5 grams of Hydrosilylation Catalyst were disposed in the flask, and the contents of the flask were mixed for an additional five minutes at room temperature. The contents of the flask were heated to 70° C. while mixing for 30 minutes. 25.2 grams of Alcohol Compound was disposed in the flask, and the contents of the flask were mixed for five additional minutes. An additional amount of 0.9 grams of Hydrosilylation Catalyst were disposed in the flask, and the temperature was held at 70° C. for an additional 60 minutes while stirring. The temperature at which the contents of the flask were heated was increased to 100° C. and held for an additional 60 minutes. Then, the temperature was reduced to 60° C., and a vacuum was applied to the contents of the flask for 60 minutes. An organopolysiloxane having carbinol functionality (the "Organopolysiloxane 1") was obtained and collected from the flask upon cooling to room temperature. The Mn, Mw, PDI, and hydroxyl content of the Organopolysiloxane 1 were measured as described above and reported below in Tables 2 and 3. In Table 3, hydroxyl content was measured for two different batches of the Organopolysiloxane 1, and hydroxyl content was measured three times for each batch. In the reaction product containing the Organopolysiloxane 1, residual Alcohol Compound was non-detectable and below 1 ppm and residual Initial Organosiloxane 1 was detected to be below 100 ppm.

TABLE 2

Properties of the Organopolysiloxane 1

| Component | Mn (PS equivalent) | Mw (PS equivalent) | PDI |
|---|---|---|---|
| Organopolysiloxane 1 | 4114 | 74867 | 18.2 |

TABLE 3

Hydroxyl Content of Organopolysiloxane 1

| Sample Name | Sample Weight(g) | Hydroxyl number (mg KOH/g) | Average Hydroxyl number (mg KOH/g) | RSD(%) |
|---|---|---|---|---|
| Organopolysiloxane 1 batch 1 | 1.8029 | 69.02 | 69.0 | 0.17 |
| | 1.7832 | 68.94 | | |
| | 1.7683 | 69.18 | | |
| Organopolysiloxane 1 batch 2 | 1.9059 | 68.76 | 68.8 | 0.15 |
| | 1.8372 | 68.87 | | |
| | 1.8472 | 68.66 | | |

Preparation Example 2: Synthesis of Organopolysiloxane Having Silicon Hydride Functionality 60 grams of Initial Organosiloxane 2, 415.8 grams of Cyclic Siloxane, 37.5 grams of Cyclic Organohydrogensiloxane, and 48 grams of Equilibrium Catalyst were disposed in a 1000 mL three neck flask equipped with a mechanical stirrer, $N_2$ inlet, and condenser. The flask was purged with $N_2$ for 10 minutes, and the contents of the flask were heated at 60° C. for 48 hours. After 48 hours, the contents of the flask were centrifuged and filtered through cotton and silica to remove the Equilibrium Catalyst. Then, the contents of the flask were rota-vaped at 70° C. for 1 hour to remove other volatiles to give a product. The product is a reaction intermediary of formula $M_4D_{36}D^H_4Q$.

Preparation Example 3: Synthesis of Organopolysiloxane Having Carbinol Functionality 484 grams of the reaction intermediary of Preparation Example 2, 111.8 grams Alcohol Compound, 242 grams of Solvent 2, 0.484 grams sodium acetate (NaAc), and 1.21 grams Hydrosilylation Catalyst were disposed in a 1000 mL 3-neck flask equipped with a mechanical stirrer, $N_2$ inlet, and condenser. The contents of the flask were agitated and mixed at 400 rpm for 10 minutes at room temperature. Then, the flask was heated at 70° C. for two hours. The contents of the flask were then filtered through cotton and silica to give a product. The product is combined with 10 g VE in Solvent 2 (1% solution) and rota-vaped at 70° C. for one hour, and then a 110° C. oil pump is utilized to further strip volatile species for two hours. An organopolysiloxane having carbinol functionality (the "Organopolysiloxane 2") was obtained and collected from the flask upon cooling to room temperature.

Examples 1-3 and Comparative Examples 1-4: Compositions

Compositions for preparing release coatings were prepared. The compositions were two part compositions: (1) Part (A) comprises the Isocyanate 1 or 2, along with the Solvent 1 (if utilized); and (2) Part (B) comprises the remaining components. Table 4 shows the relative amounts of the components in each of the compositions of Examples 1-3 and Comparative Examples 1-4. The values in Table 4 are grams (except for the NCO/OH index, which is a unitless molar ratio). C.E. indicates Comparative Example.

TABLE 4

Compositions of Examples 1-3 and Comparative Examples 1-4:

| Component | Ex. 1 | Ex. 2 | Ex. 3 | C.E. 1 | C.E. 2 | C.E. 3 | C.E. 4 |
|---|---|---|---|---|---|---|---|
| Organopolysiloxane 1 (g) | 1.00 | 0.75 | 1.00 | 0 | 1.00 | 1.00 | 1.00 |
| Chain Extender (g) | 0 | 0.24 | 0 | 1.00 | 0 | 0 | 0 |
| Isocyanate 1 (g) | 0.065 | 0.07 | 0.065 | 0.085 | 0 | 0.13 | 0.065 |
| Isocyanate 2 (g) | 0 | 0 | 0 | 0 | 0.11 | 0 | 0 |
| Catalyst 1 (g) | 0.001 | 0.001 | 0.001 | 0.001 | 0.001 | 0.001 | 0 |
| Catalyst 4 (g) | 0 | 0 | 0 | 0 | 0 | 0 | 0.01 |
| Solvent 1 (g) | 0 | 0 | 0.2 | 0 | 0 | 0 | 0 |
| NCO/OH Index | 100 | 100 | 100 | 100 | 100 | 200 | 100 |

Examples 1-3 and Comparative Examples 1-4: Release Coatings

Release coatings were formed with the compositions of Examples 1-3 and Comparative Examples 1-4. In each Example, Part B of each composition was disposed into a container, followed by Part A to give a mixture. Each mixture was thoroughly blended using a mechanical stirrer at 1000 rpm for 1 min. After mixing, each mixture was coated onto a substrate with a controlled thickness of 1 μm with the aid of a coater at room temperature to give a wet deposit on the substrate. Then, the wet deposit on the substrate was put into an oven set at predetermined temperature (90° C.) to determine whether the wet deposit would cure to give a release coating. The remaining volume of each composition was kept at room temperature for gel time determination. The release coatings were evaluated as described above, and the results are set forth below in Table 5.

TABLE 5

| Release Coatings of Examples 1-3 and Comparative Examples 1-4: | | | | | | | |
|---|---|---|---|---|---|---|---|
| Property: | Ex. 1 | Ex. 2 | Ex. 3 | C.E. 1 | C.E. 2 | C.E. 3 | C.E. 4 |
| Curing at 90° C. for 1 min | Cured | Cured | Cured | No Cure | Cured | Cured | Cured |
| Release force, g/in | 6.5 | 5 | 4.2 | NA | 70 | 11 | 105 |
| Aged release force, g/in | 21 | 12 | 9.2 | NA | 400 | 42 | 270 |
| SAS | 68% | 68% | 75% | NA | 68% | 68% | 85% |
| Anchorage Rate (RO %) | 73% | 9% | 52% | NA | 84% | 90% | 71% |

Example 1: Temperature Influence on Release Force

Three additional release coatings were formed with the composition of Example 1 based on the procedure described above. In particular, these additional release coatings were formed via curing at different temperatures to determine influence of temperature on resulting release force and aged release force. The only difference in the additional release coatings formed with the composition of Example 1 was the predetermined temperature utilized to form the particular release coating. The results are set forth below in Table 6.

TABLE 6

| Release Coatings Formed with Example 1: | | | |
|---|---|---|---|
| | Property: Cure Temp (1 minute) | | |
| | 70° C. | 80° C. | 90° C. |
| Release force, g/in | 10.1 | 9.2 | 6.5 |
| Aged release force, g/in | 22.6 | 20.3 | 21 |

Examples 4-8 and Comparative Example 5: Compositions

Additional compositions for preparing release coatings were prepared in Examples 4-8 and Comparative Example 5. In Examples 4-8 and Comparative Example 5, the compositions were two part compositions: (1) Part (A) comprises the Isocyanate 1, along with the Solvent 1 (if utilized); and (2) Part (B) comprises the remaining components. Table 7 shows the relative amounts of the components in each of the compositions of Examples 4-8 and Comparative Example 5. The values in Table 7 are grams (except for the NCO/OH index, which is a unitless molar ratio). C.E. indicates Comparative Example.

TABLE 7

| Examples 4-8 and Comparative Example 5: | | | | | | |
|---|---|---|---|---|---|---|
| Component | Ex. 4 | Ex. 5 | Ex. 6 | Ex. 7 | Ex. 8 | C.E. 5 |
| Organopolysiloxane 1 (g) | 1.0 | 1.0 | 1.0 | 1.0 | 1.0 | 2.0 |
| Isocyanate 1 (g) | 0.065 | 0.065 | 0.065 | 0.065 | 0.065 | 0.065 |
| Catalyst 1 (g) | 0.0010 | 0.0010 | 0 | 0 | 0 | 0 |
| Catalyst 2 (g) | 0 | 0 | 0 | 0 | 0 | 0.0010 |
| Solvent 1 (g) | 0 | 0.20 | 0 | 0.20 | 0.20 | 0 |
| Petroleum Ether (g) | 0 | 0 | 0.20 | 0 | 0 | 0 |
| Inhibitor 1 (g) | 0.0040 | 0 | 0 | 0 | 0 | 0.0040 |
| Inhibitor 2 (g) | 0 | 0.010 | 0 | 0 | 0 | 0 |
| Catalyst 3 (g) | 0 | 0 | 0.0020 | 0.0020 | 0 | 0 |
| Catalyst 5 (g) | 0 | 0 | 0 | 0 | 0.0020 | 0 |
| NCO/OH Index | 100 | 100 | 100 | 100 | 100 | 100 |

Examples 4-8 and Comparative Example 5: Release Coatings

Release coatings were formed with the compositions of Examples 4-8 and Comparative Example 5. In each Example, Part B of each composition was disposed into a container, followed by Part A to give a mixture. Each mixture was thoroughly blended using a mechanical stirrer at 1000 rpm for 1 m. After mixing, each mixture was coated onto a substrate with a controlled thickness of ~1 μm with the aid of a coater at room temperature to give a wet deposit on the substrate. Then, the wet deposit on the substrate was put into an oven set at predetermined temperature (90° C.) to determine whether the wet deposit would cure to give a release coating in one minute. The remaining volume of each composition was kept at room temperature for gel time determination. The results are set forth below in Table 8.

TABLE 8

| Properties of Compositions of Examples 4-8 and Comparative Example 5: | | | | | | |
|---|---|---|---|---|---|---|
| Property | Ex. 4 | Ex. 5 | Ex. 6 | Ex. 7 | Ex. 8 | C.E. 5 |
| Curing at 90° C. for 1 min | Cured | Cured | Cured | Cured | Cured | No cure |
| Gel time at RT (min) | 15 | 30 | 180 | 300 | 600 | 30 |

Examples 9-12: Compositions

Compositions for preparing release coatings were prepared for purposes of determining cure speed. Table 9 below shows the relative amounts of the components in each of the compositions of Examples 9-12. The values in Table 9 are grams except for solids content.

TABLE 9

Compositions of Examples 9-12

| Component | Ex. 9 | Ex. 10 | Ex. 11 | Ex. 12 |
|---|---|---|---|---|
| Organopolysiloxane 2 (g) | 1.0 | 1.0 | 1.0 | 1.0 |
| Isocyanate 1 (g) | 0.091 | 0.091 | 0.091 | 0.091 |
| Catalyst 6 (g) | 0.052 | 0.052 | 0.052 | 0.052 |
| Inhibitor 1 (g) | 0 | 0.055 | 0.20 | 0.55 |
| Total mass (g) | 1.14 | 1.19 | 1.29 | 1.64 |
| Solids (%) | n/a | 91.45 | 84.38 | 66.40 |

The compositions of Examples 9-12 were then analyzed for cure properties. In particular, each composition was heated at 90° C. for one minute and 90° C. for two minutes to determine whether each particular composition would cure after applying each composition on a substrate via a #6 Meyer bar to give an uncured film having a coat weight within 0.8 to 1.5 g/m$^2$. In addition, flowability at room temperature after four hours and after 24 hours was measured for each composition. The results are below in Table 10. In Table 10, "D" indicates full drying of a reaction product, and T indicates a reaction product is tacky (i.e., not fully dried). Drying, as represented by D and T, is measured via touch. Flowability is measured via visual inspection.

TABLE 10

| Example: | Cure @ 90° C./ 1 minute | Cure @ 90° C./ 2 minutes | Flowability after 4 hours at RT | Flowability after 24 hours at RT |
|---|---|---|---|---|
| 9 | D | D | Gelled | n/a |
| 10 | D | D | Flowable | Gelled |
| 11 | D | D | Flowable | Flowable |
| 12 | T | D | Flowable | Flowable |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

What is claimed is:

1. A composition for forming a release coating, said composition comprising:
    (A) an organopolysiloxane having an average of at least two carbinol functional groups per molecule, the organopolysiloxane (A) being present in the composition in an amount of from 50 to 99 wt. % based on the total weight of the composition; and
    (B) a polyisocyanate;
        wherein the organopolysiloxane (A) has the following average formula:

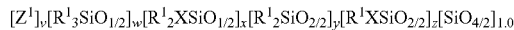

$$[Z^1]_v[R^1_3SiO_{1/2}]_w[R^1_2XSiO_{1/2}]_x[R^1_2SiO_{2/2}]_y[R^1XSiO_{2/2}]_z[SiO_{4/2}]_{1.0}$$

wherein $1 \leq v \leq 12$; $0 \leq w \leq 8$, $0 \leq x \leq 8$, $40 \leq y \leq 1{,}000$ and $0 \leq z \leq 8$, with the proviso that $2 \leq (x+z) \leq 8$; each $R^1$ is an independently selected substituted or unsubstituted hydrocarbyl group; each X is an independent selected carbinol functional group; and $Z^1$ is independently ($O_{1/2}SiR^1_2$-$D^1$-$R^1SiO_{2/2}$) or ($O_{1/2}SiR^1_2$-$D^1$-$R^1_2SiO_{1/2}$), where each $R^1$ is independently selected and defined above, and each $D^1$ is an independently selected divalent hydrocarbon linking group; and
    wherein the release coating formed with the composition is not a foam.

2. The composition of claim 1, wherein: (i) the composition further comprises (C) a catalyst; (ii) the composition is free from physical blowing agents; (iii) the composition is free from chemical blowing agents; or (iv) any combination of (i)-(iii).

3. The composition of claim 1, wherein the organopolysiloxane (A) includes an average of three or more carbinol functional groups.

4. The composition of claim 1, wherein the carbinol functional groups independently have the general formula -D-O$_a$—(C$_b$H$_{2b}$O)$_c$—H, where D is a divalent hydrocarbon linking group having from 2 to 18 carbon atoms, subscript a is 0 or 1, subscript b is independently selected from 2 to 4 in each moiety indicated by subscript c, and subscript c is from 0 to 500, with the proviso that subscripts a and c are not simultaneously 0.

5. The composition of claim 1, wherein the carbinol functional groups have the general formula:

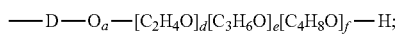

$$\text{—D—O}_a\text{—[C}_2\text{H}_4\text{O]}_d\text{[C}_3\text{H}_6\text{O]}_e\text{[C}_4\text{H}_8\text{O]}_f\text{— H};$$

where D is a divalent hydrocarbon linking group having from 2 to 18 carbon atoms, subscript a is 0 or 1, $0 \leq d \leq 500$, $0 \leq e \leq 500$, and $0 \leq f \leq 500$, with the proviso that $1 \leq d+e+f \leq 500$.

6. The composition of claim 1, wherein the organopolysiloxane (A) has the following average formula: SiY$_4$, where each Y independently has the formula:

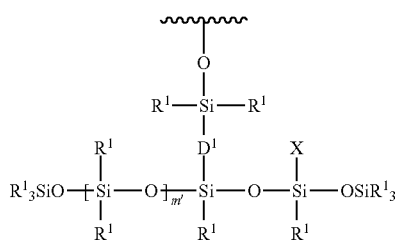

wherein each $R^1$ is an independently selected substituted or unsubstituted hydrocarbyl group; each X is an independent selected carbinol functional group; each $D^1$ is an independently selected divalent hydrocarbon linking group; and each subscript m' is independently from 10 to 250.

7. The composition of claim 1, wherein: (i) the polyisocyanate (B) comprises an aliphatic polyisocyanate; (ii) the composition is free from organic polyols; or (iii) both (i) and (ii).

8. The composition of claim 1, further comprising at least one of: (D) an inhibitor; (E) a chain extender; and/or (F) a carrier vehicle.

9. The composition of claim 1, wherein: (i) the composition has an isocyanate index of from 75 to 125; (ii) the composition can be cured at 90° C. in less than one minute; or (iii) both (i) and (ii).

10. A release coating formed from the composition of claim 1.

11. A method of forming a coated substrate, said method comprising:
applying a composition on a substrate; and
curing the composition to give a release coating on the substrate, thereby forming the coated substrate;
wherein the composition is the composition of claim 1.

12. The method of claim 11, wherein applying the composition on the substrate forms a wet deposit on the substrate, and curing the composition comprises exposing the wet deposit to an elevated temperature for a period of time.

13. The method of claim 12, wherein: (i) the elevated temperature is from 70 to 100° C.; (ii) the period of time is from 45 seconds to 75 seconds; or (iii) both (i) and (ii).

14. The method of claim 11, wherein the substrate comprises cellulose and/or a polymer.

15. A coated substrate comprising a release coating disposed on a substrate formed in accordance with the method of claim 11.

* * * * *